Patented Mar. 18, 1952

2,590,072

UNITED STATES PATENT OFFICE 2,590,072

METHOD OF PREPARING STABILIZED ROSIN NITRILES

John Drew, De Ridder, La., and Joe C. Funderburk, Hattiesburg, Miss., assignors to Hercules Powder Company, Wilmington, Del., a corporation of Delaware No Drawing. Application March 14, 1950, Serial No. 149,654

9 Claims. (Cl. 260—100)

This invention relates to an improved process for the preparation of resin acid nitriles and more particularly to a process for preparing the nitrile of a stabilized rosin.

Abietonitrile has been prepared by the process of Nicodemus, U. S. 2,023,337, by treating a natural rosin with ammonia in the presence of a dehydration catalyst such as alumina, silica gel, or thorium oxide in a heterogeneous system. Stabilized rosin acid nitriles such as dehydroabietonitrile and hydroabietonitrile have not heretofore been known to the art. Although they may be prepared by the process of Nicodemus by substituting dehydrogenated or hydrogenated rosin for the natural rosin of Nicodemus, neither the yield nor the purity of the product is entirely satisfactory. Due to side reactions which take place resulting in the formation of rosin oil, the yield of stabilized rosin nitrile is proportionately diminished, and the stabilized rosin nitrile is difficult to separate in pure form from the rosin oil because of the small difference in boiling points.

Now in accordance with this invention, it has been found that stabilized resin acid nitriles may be prepared by heating a stabilized rosin in the liquid phase with gaseous ammonia in the presence of a catalytic amount of a salt of the rosin acids and a metal of group II of the periodic table.

The following examples are illustrative of the novel process of this invention. All parts given in the examples represent parts by weight.

EXAMPLE 1

A charge of 1500 parts dehydrogenated rosin was melted in a reaction vessel equipped with a sparge tube through which anhydrous ammonia was introduced, a thermometer, and a reflux condenser for condensing oils but not water vapor. To this molten resin was added 2.5 parts zinc oxide which formed 20 parts zinc salt of dehydrogenated rosin as the temperature was raised to 325° C. resulting in a solution of the zinc resinate in dehydrogenated rosin. Dry ammonia was then added through the sparge tube at the rate of 85 parts by weight per hour until an acid number of about 5 was reached. This required 8.5 hours. During the period of reaction with the ammonia, the temperature was held at 325° C.±5° C. The resulting product amounted to 1373 parts which contained 83.3% dehydrogenated rosin nitrile based on the nitrogen content. The calculated productivity was thus 0.762 based on the dehydrogenated rosin used.

*Table I*

| Example | Blank | 1 | 2 | 3 | 4 | 5 | 6 | 7 | 8 | 9 | 10 | 11 |
|---|---|---|---|---|---|---|---|---|---|---|---|---|
| Dehydrogenated Rosin (Wt.) | 1,500 | 1,500 | 1,500 | 1,500 | 1,500 | 1,500 | 1,500 | 1,500 | 1,500 | 1,500 | | |
| Hydrogenated Rosin (Wt.) | | | | | | | | | | | 1,500 | 1,500 |
| Resinate | None | Zn | Zn | Zn | Sr | Mg | Zn | Zn | Zn | Zn | None | Zn |
| Calc'd Wt | | 20 | 10 | 20 | 10 | 10 | 9 | 0.8 | 4 | 2 | | 5 |
| Reaction Time (Hr.) | 29.5 | 8.5 | 8.5 | 8.5 | 15.5 | 9 | 10.5 | 20 | 13 | 15 | 12.2 | 8.8 |
| Crude Nitrile Weight | 1,260 | 1,373 | 1,335 | 1,367 | 1,307 | 1,311 | 1,333 | 1,307 | 1,300 | 1,277 | 1,258 | 1,321 |
| Purity Per Cent | 85.3 | 83.3 | 87.3 | 85.6 | 84.3 | 86.6 | 87.4 | 87.8 | 89.4 | 87.4 | 72.0 | 81.1 |
| Productivity—Parts Rosin Nitrile Per 100 Parts Rosin | 71.7 | 76.2 | 77.8 | 78.0 | 73.4 | 75.7 | 77.7 | 76.5 | 77.5 | 74.4 | 60.4 | 71.0 |

In Table I are given the data on Example 1 and other examples carried out using substantially the procedure of Example 1. In Examples 2 through 5, the catalysts were metal resinates prepared by the precipitation process. In Examples 6 and 11, the catalyst was a zinc resinate prepared by fusion of the calculated amount of zinc acetate with the stabilized rosin which was used in the conversion to the nitrile. In Examples 1, 7, 8, and 9, the zinc resinate was prepared by fusing the calculated amount of zinc oxide with the dehydrogenated rosin used in the conversion to the nitrile until a complete solution of the zinc resinate in the rosin was obtained. The blank run without catalyst was made in the manner described for Example 1 except that no catalyst was added to the stabilized rosin prior to or during the course of the reaction with the ammonia.

The catalysts of this invention are the salts of the resin acids and a metal of group II of the periodic table, particularly the magnesium, calcium, zinc, strontium, and barium salts. The salts may be prepared in any well-known manner such as the precipitation method, in which case they are added to the rosin prior to treatment with ammonia. However, the salts are preferably prepared in situ by adding the oxide, hydroxide, or salt of a lower volatile fatty acid salt and a group II metal to the molten rosin and allowing reaction to take place at fusion temperatures up to about 300° C. with resultant formation of a homogeneous solution of the resin acid salt prior to addition of the ammonia. The salt may likewise be formed in situ by reaction between an inorganic salt of the metal, the resin acid, and ammonia. For example, the reaction of rosin, zinc chloride, and ammonia will form zinc resinate, and ammonium chloride which will quickly sublime from the system. Traces of water which may aid the reaction result from the first traces of nitrile to form.

The amount of catalyst of this invention which is used should be in the catalytic range, i. e., sufficient should be used to accelerate the reaction. Usually the amount will be within the range of about 0.01% and 6% based upon the stabilized rosin. The preferred amount of catalyst is within the range of about 0.1% and about 2.5% based on the weight of stabilized rosin used.

The stabilized rosins used in the process of this invention need not be highly refined. The hydrogenated and disproportionated rosins are usually already in a refined state since they must be relatively free of poisons which would inactivate the catalysts for the hydrogenation or disproportionation of the rosin acids. Further refining is not necessary. In all cases, however, the rosin used may have been refined prior to use by the well-known selective adsorbent or solvent refining methods. The hydrogenated rosin may be produced by any of the usual catalytic hydrogenation methods in the molten state or in the presence of a solvent using catalysts such as palladium, platinum, nickel, cobalt, and the like. The hydrogenated rosin used may be either completely or partially hydrogenated. The dehydrogenation or disproportionation reaction may be carried out by contacting the rosin or rosin material at an elevated temperature with an active hydrogenation catalyst in the absence of added hydrogen to effect a dehydrogenation or disproportionation. The above-mentioned hydrogenation catalysts with or without catalyst supports are satisfactory for the dehydrogenation reaction.

If desired, the process of this invention may be carried out on pure resin acids such as dihydroabietic acid, tetrahydroabietic acid, or dehydroabietic acid. In each instance, the nucleus of the resulting nitrile has the same characteristic ring system as that of a stabilized rosin acid.

The catalysts of the present invention are completely soluble in the stabilized rosins in the catalytic amounts used at the temperature of reaction. The metal resinates thus form a homogeneous system with the rosin and side reactions are at a minimum. The metal resinates in this respect differ from the catalysts of the prior art which were insoluble in the rosin used and formed a heterogeneous mixture of rosin and catalyst which was treated with the ammonia.

The reaction of the stabilized rosins with ammonia is carried out at a temperature of about 250° C. to about 350° C. and preferably is carried out at about 315° C. to about 335° C.

Any convenient form of apparatus may be used. The apparatus should preferably be designed to facilitate rapid removal of water as fast as it is formed. This is advantageously accomplished by use of a heated reflux column on the reaction vessel heated to such a temperature that the nitrile may reflux and water will distill out as vapor. The preferred column temperature is at least 100° C. At temperatures above 350° C. the yield is lowered somewhat by loss of product.

Any means of contacting the hydrogenated or dehydrogenated rosin or rosin acids, in liquid phase, with ammonia may be used. The rosin material may be dissolved in an inert solvent, if desired, however, the reaction is readily carried out in the absence of a solvent by passing the ammonia directly into the molten rosin. The use of a sparge tube usually provides for sufficient contact between the ammonia and rosin material. The amount of ammonia used in the reaction depends upon the efficiency of the ammonia-rosin contact. In any event, it should be at least the quantity necessary to react completely with the resin acids present. In the above examples the ammonia sparge rate was adjusted so that roughly every hour sufficient ammonia had passed into the reaction mixture to completely react with the acids present. The reaction may be carried out under pressure or under a slight vacuum; however, it is conveniently carried out at atmospheric pressure. The ammonia gas may be diluted with any inert gas such as nitrogen, if desired.

Ammonia is passed into the resin acids in liquid phase until the reaction is essentially complete. Usually, it is convenient to add ammonia until the acid number of the reaction mixture is below 5. However, the reaction may be carried out until the amount of unreacted acid is negligible.

The reaction mixtures may be distilled in vacuo to give an acid-free product. The reaction mixture may be distilled without neutralization, but in this case, if an acid-free product is desired, it is necessary to carry out the distillation with very careful fractionation.

The resin acid nitriles, prepared from hydrogenated and dehydrogenated rosin, distill readily in vacuo to give viscous, sticky oils that vary in color from water white to light yellow. The resin acid nitriles prepared from hydrogenated rosins have boiling points between 155° C. to 180° C. at 0.5 mm. of mercury and those from dehydrogenated rosin from 160° C. to 185° C. at 0.5 mm. of mercury. The exact boiling point of these nitriles is, of course, dependent upon the rosin used as a starting material, as these rosins are made up of a mixture of resin acids.

The nitrile from dehydrogenated rosin partially crystallizes on standing to give dehydroabietonitrile, which can be purified by crystallization from alcohol to give pure dehydroabietonitrile in the form of colorless crystals having a melting point of 87° C. to 87.8° C.

The resin acid nitriles prepared in accordance with this invention may be used as insecticides, rubber softeners, oil additives, plasticizers, etc. They are particularly valuable as chemical intermediates for the preparation of amines, amides, amidines, etc.

What we claim and desire to protect by Letters Patent is:

1. The process of preparing a stabilized rosin acid nitrile which comprises reacting the rosin acids of a stabilized rosin of the group consisting of dehydrogenated rosin and hydrogenated rosin in liquid phase with gaseous ammonia in the presence of a catalytic amount of a metal salt of rosin acids wherein said metal is a metal of group II of the periodic table.

2. The process of preparing a stabilized rosin acid nitrile which comprises reacting the rosin acids of a stabilized rosin of the group consisting of dehydrogenated rosin and hydrogenated rosin in liquid phase at a temperature of about 250° C. to about 350° C. with gaseous ammonia in the presence of a catalytic amount of a metal salt of rosin acids wherein said metal is a metal of group II of the periodic table.

3. The process of preparing a stabilized rosin acid nitrile which comprises reacting the rosin acids of a stabilized rosin of the group consisting of dehydrogenated rosin and hydrogenated rosin in liquid phase at a temperature of about 315° C. to about 335° C. with gaseous ammonia in the presence of a catalytic amount of a metal salt of rosin acids wherein said metal is a metal of group II of the periodic table.

4. The process of preparing a hydrogenated rosin acid nitrile which comprises reacting the rosin acids of a hydrogenated rosin in liquid phase at a temperature of about 315° C. to about 335° C. with gaseous ammonia in the presence of a catalytic amount of a metal salt of said rosin acids wherein said metal is a metal of group II of the periodic table.

5. The process of preparing a hydrogenated rosin acid nitrile which comprises reacting the rosin acids of a hydrogenated rosin in liquid phase at a temperature of about 315° C. to about 335° C. with gaseous ammonia in the presence of a catalytic amount of a zinc salt of said rosin acids.

6. The process of preparing a dehydrogenated rosin acid nitrile which comprises reacting the rosin acids of a dehydrogenated rosin in liquid phase at a temperature of about 315° C. to about 335° C. with gaseous ammonia in the presence of a catalytic amount of a metal salt of said rosin acids wherein said metal is a metal of group II of the periodic table.

7. The process of preparing a dehydrogenated rosin acid nitrile which comprises reacting the rosin acids of a dehydrogenated rosin in liquid phase at a temperature of about 315° C. to about 335° C. with gaseous ammonia in the presence of a catalytic amount of a zinc salt of said rosin acids.

8. The process of preparing a hydrogenated rosin acid nitrile which comprises reacting the rosin acids of a hydrogenated rosin in liquid phase at a temperature of about 315° C. to about 335° C. with gaseous ammonia in the presence of a catalytic amount of a calcium salt of said rosin acids.

9. The process of preparing a dehydrogenated rosin acid nitrile which comprises reacting the rosin acids of a dehydrogenated rosin in liquid phase at a temperature of about 315° C. to about 335° C. with gaseous ammonia in the presence of a catalytic amount of a calcium salt of said rosin acids.

JOHN DREW.
JOE C. FUNDERBURK.

REFERENCES CITED

The following references are of record in the file of this patent:

UNITED STATES PATENTS

| Number | Name | Date |
|---|---|---|
| 2,375,005 | Kung | May 1, 1945 |
| 2,493,637 | Niederhauser | Jan. 3, 1950 |
| 2,503,268 | Hasseltrom | Apr. 11, 1950 |
| 2,511,603 | Spurlin | June 13, 1950 |